(12) United States Patent
Pinto

(10) Patent No.: US 6,661,576 B2
(45) Date of Patent: Dec. 9, 2003

(54) METHOD AND APPARATUS FOR CONTROLLING DISPERSION FORCES

(76) Inventor: Fabrizio Pinto, 115 N. Fifth Ave., Monrovia, CA (US) 91016

( * ) Notice: Subject to any disclaimer, the term of this patent is extended or adjusted under 35 U.S.C. 154(b) by 0 days.

(21) Appl. No.: 10/034,549

(22) Filed: Dec. 28, 2001

(65) Prior Publication Data

US 2002/0114088 A1 Aug. 22, 2002

Related U.S. Application Data

(60) Provisional application No. 60/259,167, filed on Dec. 30, 2000.

(51) Int. Cl.⁷ .................................................. G02B 5/28
(52) U.S. Cl. ....................... 359/584; 359/580; 359/900; 250/526
(58) Field of Search ................................ 359/580, 584, 359/589, 900; 250/526

(56) References Cited

U.S. PATENT DOCUMENTS

2002/0135877 A1 * 9/2002 Fan et al. .................... 359/577

FOREIGN PATENT DOCUMENTS

| DE | 3541084 A1 | * | 8/1987 |
| GB | 2276488 A | * | 9/1994 |
| GB | 2283611 A | * | 5/1995 |
| GB | 2325778 A | * | 8/1998 |
| GB | 2352320 A | * | 1/2001 |

OTHER PUBLICATIONS

T.V. Prevenslik, "The Casimir Force—Neutral or Electrostatic?" ESD Journal, Feb. 10, 2003, www.esdjournal.com/techpapr/prevens/casimir/casimir.htm.*

Astrid Lambrecht, "The Casimir effect: a force from nothing", Physics World Sep. 2002, http://physicsweb.org/article/world/15/9/6.*

Eyal Buks and Michael L. Roukes, "Quantum physics: Casimir force changes sign", Nature 419, Sep. 12, 2002, pp. 119–120.*

O. Kenneth, et al., "Repulsive Casimir Forces", Physical Review Letters, vol. 89, No. 3, 033001, Jul. 15, 2002.*

F. Chen and U. Mohideen, "Demonstration of the Lateral Casimir Force", Physical Review Letters, vol. 88, No. 10, 101801, Mar. 11, 2002.*

H.B. Chan, et al., "Quantum Mechanical Actuation of Microelectromechanical Systems by the Casimir Force", Science vol. 291, pp. 1941–1944, Mar. 9, 2001, with corrections.*

E. Buks and M.L. Roukes, "Stiction, adhesion energy, and the Casimir effect in micromechanical systems", Phys. Rev. B, vol. 63, No. 3, 033402, Jan. 15, 2001.*

D.N. Chigrin, et al., "All–Dielectric One–Dimensional Periodic Structures for Total Omnidirectional Reflection and Partial Spontaneous Emission Control", J. Lightwave Techn., vol. 17, No. 11, pp. 2018–2024, Nov. 1999.*

(List continued on next page.)

Primary Examiner—John Juba
(74) Attorney, Agent, or Firm—DeMont & Breyer, LLC

(57) ABSTRACT

An article and method for controlling the sign (repulsion or attraction) and magnitude of dispersion forces, such as the Casimir force. In accordance with one embodiment of the present teachings, dispersion forces are controlled by selectively reflecting only those spectral components (i.e., frequencies) at which the random oscillations of the electromagnetic field contribute to the force behavior desired, while substantially suppressing all other spectral components. In one embodiment, the selected spectral components are omni-directionally reflected using photonic band gap materials.

21 Claims, 1 Drawing Sheet

OTHER PUBLICATIONS

P.St.J. Russell, et al., "Full photonic bandgaps and spontaneous emission control in 1–D multilayer dielectric structures", CLEO '99, CThK12, p. 405, May 27, 1999.*

L.H. Ford, "Spectrum of the Casimir effect and the Lifshitz theory", Phys. Rev. A vol. 48, No. 4, pp. 2962–2967, Oct. 1993.*

H.B. Chan, et al., "Nonlinear Micromechanical Casimir Oscillator", Phys. Rev. Lett., vol. 87, No. 21, 211801, Nov. 19, 2001.*

Timothy H. Boyer, "Van der Waals forces and zero–point energy for dielectric and permeabl materials", Phys. Rev. A vol. 9, No. 5, pp. 2078–2084, May 1974.*

Gerald Feinberg, "General Theory of the van der Waals Interaction: A Model–Independent Approach", Phy. Rev. A vol. 2, No. 6, pp. 2395–2415, Dec. 1970.*

U. Mohideen and Anushree Roy, "Precision Measurement of the Casimir Force from 0.1 to 0.9 $\mu$m", Phys. Rev. Lett., vol. 81, No. 21, pp. 4549–4552, Nov. 23, 1998.*

Xin–zhou Li, et al., "Attractive or repulsive nature of the Casimir force for rectangular cavity", Phys. Rev. D, vol. 56, No. 4, pp. 2155–2162, Aug. 15, 1997.*

S.J. van Enk, "Casimir torque between dielectrics", Phys. Rev. A, vol. 52, No. 4, pp. 2569–2575, Oct. 1995.*

P. St. J. Russell, et al., "Full photonic bandgaps and spontaneous emission control in 1D multilayer dielectric structures", Optics Comm. 160, pp. 66–71, Feb. 1, 1999.*

J. Winn, et al., "Omnidirectional reflection from a one–dimensional photonic crystal", Optics Lett., vol. 23, No. 20, pp. 1573–1575, Oct. 15, 1998.*

Y. Fink, et al., "A Dielecric Omnidirectional Reflector", Science 282, 5394 pp. 1679–1682, Nov. 27, 1998.*

* cited by examiner

METHOD AND APPARATUS FOR CONTROLLING DISPERSION FORCES

STATEMENT OF RELATED APPLICATIONS

This application claims the benefit of U.S. provisional application Ser. No. 60/259,167, filed Dec. 30, 2000, entitled "Method and Apparatus for Controlling Dispersion Forces," which is also incorporated herein by reference.

FIELD OF THE INVENTION

The present invention relates to an apparatus and method for controlling the behavior (repulsive or attractive) and magnitude of dispersion forces, such as the Casimir force.

BACKGROUND OF THE INVENTION

Quantum field theory predicts, and experimentation has confirmed, that two, parallel, neutral (i.e., not electrically charged) planar slabs of any material that are separated from one another give rise to a mutually attractive force. This force is usually called the Casimir force after the theorist that postulated its existence in 1948.

The Casimir force is due to the perturbation, caused by the slab boundaries, on the random oscillations (due to Heisenberg's uncertainty principle) of the electromagnetic field. In the region of space that is not between the slabs, the values of the electric and magnetic fields can freely fluctuate. But in the region of space that is between the slabs, the modes of oscillation of the electric and magnetic fields are restricted. Consequently, a gradient arises wherein the energy density in the region that is not between the slabs is greater than the energy density in the region between the slabs. This gradient is ultimately responsible for the Casimir force.

Most theoretical analyses have treated the Casimir force as an attractive force. But it has been suggested that, under certain circumstances, the Casimir force might manifest as a repulsive interaction. This is a consequence of the symmetry of the Maxwell equations under appropriate exchanges of the electric and magnetic fields. In particular, it has been predicted that the Casimir force between a perfectly conducting and a perfectly magnetically permeable material is repulsive. While this prediction has not been tested experimentally, it is based on the same body of evidence that has produced all the predictions about the Casimir force that have been verified to date.

In a recent treatment, the Casimir force is considered to be the net force that results from the contribution of each of an infinite number of spectral (i.e., frequency/wavelength) components. See Ford, L. H., "Spectrum of the Casimir Effect and the Lifshitz Theory," Phys. Rev. A, vol. 48, no. 4, p 2962 (1993), incorporated by reference herein. By analyzing the oscillations that comprise the Casimir force on a frequency-by-frequency basis, the contribution of each frequency to the total Casimir force can be determined. According to this work, the Casimir force appears to be the net result of a "near" exact cancellation of forces at all frequencies, all of which forces are much larger than the net force (i.e., the resulting Casimir force).

A question arises as to whether or not it is possible to controllably alter this infinite sum of terms. If it is possible, for example, to include only the "attractive" contributions or only the "repulsive" contributions, then the "sign" or "behavior" (i.e., repulsive or attractive) of the Casimir force can be controllably determined. Furthermore, if the contributions can be manipulated in this manner, then, in principle at least, the magnitude of the force can be increased without limit. See, Ford, L. H., "Casimir Force Between a Dielectric Sphere and a Wall: A Model for Amplification of Vacuum Fluctuations," Phys. Rev. A, vol. 58, no. 6, p. 4279 (1998), incorporated by reference herein.

Until now, no one has identified a system of two parallel plates that allows for the isolation of certain contributions while suppressing all others. This has been attributed to the fact that materials cannot be devised (due to fundamental physical reasons relating to causality) whose bulk properties display the necessary optical characteristics.

SUMMARY OF THE INVENTION

In accordance with the present teachings, the behavior and magnitude of a dispersion force is controllably altered by allowing the propagation of only those spectral components (i.e., frequencies) at which the random oscillations of the electromagnetic field contribute to the force behavior desired, while substantially suppressing all other spectral components.

In one embodiment, selective retention/suppression of spectral components is achieved by disposing two elements in spaced relation to one another. At least one of the elements comprises at least one periodic structure that is advantageously capable of achieving omni-directional selective reflection of selected spectral components. In some embodiments, such omni-directional selective reflection is obtained using photonic band gap material.

In embodiments in which the dispersion force is controllably altered to exhibit a repulsive force, the elements will repel each other. Consequently, in some embodiments wherein one of the elements is restrained from movement, the other element will "float" above it. The ability to control dispersion forces as described herein has many important applications in the areas of telecommunications, transportation, and propulsion, to name but a few.

DETAILED DESCRIPTION

Figure 1:
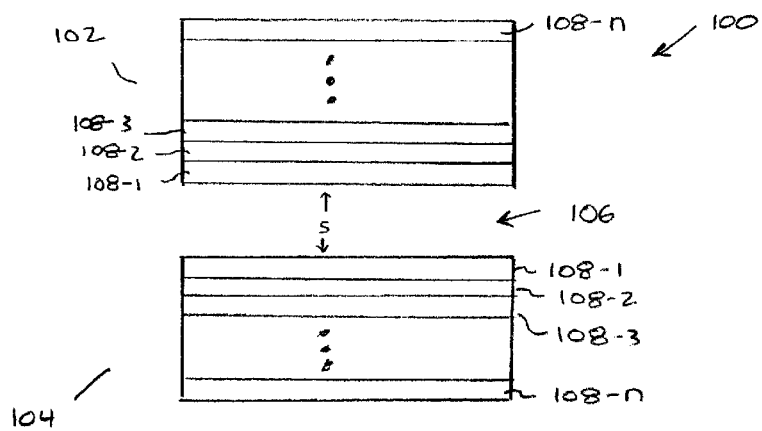
FIG. 1 depicts an apparatus for controllably altering dispersion forces in accordance with the present teachings.

The present invention pertains to a method and apparatus for manipulating dispersion forces. As used herein, the term "dispersion force" means a force existing between neutral objects that depends on (i.e., is a function of) optical properties (e.g., reflectivity, dielectric properties, etc.) of the objects. It is therefore possible to change the behavior and magnitude of a dispersion force by manipulating the optical properties of the objects giving rise to the dispersion force. Examples of dispersion forces include, without limitation, the Casimir force and the Van der Waals force.

In accordance with the present teachings, dispersion forces are controlled by forming a cavity in which only those spectral components (i.e., frequencies/wavelengths) at which the random oscillations of the electromagnetic field contribute to the force behavior desired are allowed to exist, while substantially suppressing all other spectral components.

To accomplish selective retention/suppression of spectral components, two members, which are advantageously flat planar slabs, are arranged in spaced relation to one another forming a cavity. The members exhibit an optical property whereby they selectively reflect electromagnetic radiation. As used herein, the term "selective reflection" means reflecting only certain wavelengths/frequencies while absorbing substantially all other wavelengths.

As indicated in the Background section, because of fundamental physics considerations relating to causality, it is possible that no material having the required bulk optical properties can be fabricated. The present inventor has recognized, however, that there is nothing critical about bulk optical properties, as opposed to effective properties. That is, the equations that yield the value of the Casimir force do not require that spectral selection necessarily be a consequence of the bulk optical properties of the materials involved. Consequently, in accordance with the present invention, the effective optical properties of the overall system are tailored to provide the desired frequency selective behavior.

Materials and arrangements that exhibit frequency selective behavior are well known to those skilled in the art. For example, periodic structures can exhibit selective reflectivity. In fact, it is well known that monochromatic light rays having wavelength $\lambda$ incident on a crystal at an angle $\theta$ to the surface of the crystal are reflected when:

$$2d \sin \theta = m\lambda \quad [1]$$

where:
  d is the interatomic spacing;
  m is any integer.
This condition is referred to as Bragg's Law. In application of Bragg's Law, multi-layer structures (sometimes called Bragg stacks) exhibiting selective reflectivity have been fabricated for use in optical communications, for example.

It is clear from expression [1] that the wavelength $\lambda$ that is reflected according to Bragg's Law changes with the angle of incidence from a maximum value at $\theta=\pi$ and a minimum value at $\theta=0$. Unfortunately, this dependence on the angle of incidence renders the use of such structures quite problematic for the manipulation of dispersion forces in accordance with the present teachings. In particular, the range of frequencies at which the reflectivity of such a structure is very high depends on the angle of incidence of the random fluctuations of the electromagnetic field upon the two boundaries (e.g., slabs). In contrast, the bulk reflectivity properties of a material do not depend on the angle of incidence of light rays upon it. This is the problem recognized in the prior art.

Simply put, standard multi-layer structures are poorly suited for achieving the selective reflectivity required for efficient and controllable Casimir force manipulation. In accordance with the present invention, frequency-selective reflectivity is advantageously omni-directional. As used herein, the term "omni-directional" (reflectivity) means that the reflectivity is independent of the angle of incidence of light on the surface of the structure causing the frequency selective reflection.

In some embodiments of the present invention, photonic band gap materials ("PBGs") are used to provide omni-directional, frequency-selective reflectivity for controllably altering dispersion forces.

PBGs, so named for their ability to prevent the propagation of electromagnetic waves within certain frequency ranges, have been studied extensively since first postulated in 1987. PBGs have been used to inhibit spontaneous emission in threshold lasers, to create single-mode light emitting diodes, waveguides in the optical domain, filters and polarizers, to name a few applications.

When a quantum or classical wave propagates in a periodic structure, in any number of dimensions, the dispersion curves that relate the frequencies of the wave to the wave vector characterizing its propagation possess a number of branches. These branches form bands that are separated by frequency gaps at points of symmetry in the corresponding Brillouin zones. In some cases, an absolute gap occurs (i.e., a frequency range in which no wave can propagate) that exists for all values of the wave vector in the Brillouin zone. This also gives rise to a gap in the density of states of the waves propagating through the structure. Materials that exhibit this behavior are referred to as photonic band gap materials.

This behavior applies to acoustic, electronic, neutronic as well as electromagnetic waves. The periodicity of the medium comprising the PBG must be comparable to the wavelength of the electromagnetic waves in order to inhibit their propagation.

PBGs can possess singly (one-dimensional), doubly (two-dimensional) and triply (three-dimensional) periodic dielectric lattices. In accordance with the present teachings, one-dimensional ("1D") PBGs are advantageously used, since they are easier to fabricate than two-dimensional ("2D") and three-dimensional ("3D") structures. Unfortunately, a 1D PBG cannot achieve selective reflection of all spectral components at which the random oscillations of the electromagnetic field contribute to a desired force behavior. But selectively reflecting just a few spectral components is sufficient to controllably alter both the behavior and magnitude of the dispersion force.

An example of a 1D PBG is a planar slab comprising a periodic series of very thin layers of two materials having different bulk properties (e.g., refractive index, etc.). Such an arrangement is referred to as "1D" since the optical properties of the slab changes only as a function of the depth into the slab, and only one coordinate is needed to describe them. An example of a 2D PBG is a crystal comprising a plurality of parallel columns or cylinders. The electromagnetic waves propagating in a plane perpendicular to the cylinders can be separated into two polarizations according to whether the electric (E polarization) or magnetic (M polarization) field is parallel to the cylinder axis. The band gap occurring in each case must overlap to form an absolute band gap that prevents the propagation of the electromagnetic waves of any polarization.

To ensure that the selective reflectivity is omni-directional, the contrast between (i.e., the ratio of) the refractive indices of the materials used for layering must be sufficiently high. Typically, a ratio of at least about 2:1 (or 1:2) should be sufficient to ensure omni-directionality, but this number will vary with the specific structure of the PBG.

FIG. 1 depicts an arrangement 100 according to the illustrated embodiment of the present invention wherein two, planar, PBGs 102 and 104 are disposed in spaced relation to one another defining cavity 106. PBGs 102 and 104 are separated by a distance S (i.e., the "thickness" of cavity 106).

PBGs 102 and 104 are appropriately configured to be "tuned" to the relevant frequencies of the random oscillations of the electromagnetic field in cavity 106. Those frequencies can be calculated (i.e., the spectral decomposition can be performed) using the approach described by L. H. Ford in the two papers that were cited earlier in the Background section.

The periodicities of the PBGs are set, ideally, to reflect only those spectral components (i.e., wavelengths) at which the random oscillations of the electromagnetic field contribute to the force behavior desired, while substantially suppressing all other spectral components. It is known that relatively higher frequencies (shorter wavelengths) of electromagnetic radiation correspond to relatively larger contributions to the dispersion force (e.g., Casimir force). Consequently, PBGs having very thin periodic layers 108-1 to 108-n (comparable in size to such shorter wavelengths) are advantageously used, since, as previously described, the periodicity must be comparable to the wavelength of the electromagnetic waves in order to inhibit their propagation.

It is expected that the effects of selective reflection, as taught herein, will dominate with as few as five to ten layers of material. As previously described, to create omni-directional reflectivity, adjacent layers (e.g., layers 108-1 and 108-2) should have a high contrast, at least about 2:1, in terms of the ratio of refractive indices of the adjacent layers.

Furthermore, for spectral components having very high frequency, such as the x-ray range and higher, the periodicity must be at the atomic level. Thus, the PBGs useful in conjunction with the present invention advantageously possess periodicity at different size scales; at the macro end of the wavelength scale, alternating materials layers of a predetermined thickness are used to create periodicity, while at the micro end of the scale, the crystal structure of a material creates the periodicity. In other words, PBGs useful in conjunction with the present invention advantageously comprise multiple periodic structures.

A mathematical treatment of selective omni-directional reflectivity useful for calculating the required period size (for reflecting spectral components of a given frequency) is given in Chigrin et al, "All-Dielectric, One-Dimensional Periodic Structures for Total Omni-directional Reflection and Partial Spontaneous Emission Control," J. Lightwave Tech., vol. 17, no. 11 (1999), incorporated by reference herein.

As a practical matter, it is currently very difficult, if not impossible to fabricate a PBG that will select for all the desired Casimir force spectral components. Consequently, the periodic structures of the PBG are advantageously set to reflect a group of spectral components at which the most significant contributions to the desired force behavior occurs.

Any of a wide variety of dielectric materials are suitably used to create PBGs 102 and 104. For example, in one embodiment, PBGs 102 and 104 comprise alternating layers of silicon and silicon dioxide. The ratio of the refractive indices of these materials has been shown to be sufficient to provide omni-directional reflectivity. Those skilled in the art will know of a wide variety of other suitable materials.

While PBGs 102 and 104 comprise a periodic arrangement of two materials, in other embodiments, three or more different materials are used. In yet additional embodiments, the change in optical properties through the slab is more gradual, rather than being discontinuous as when alternating layers of two different materials are used.

Figure 2:
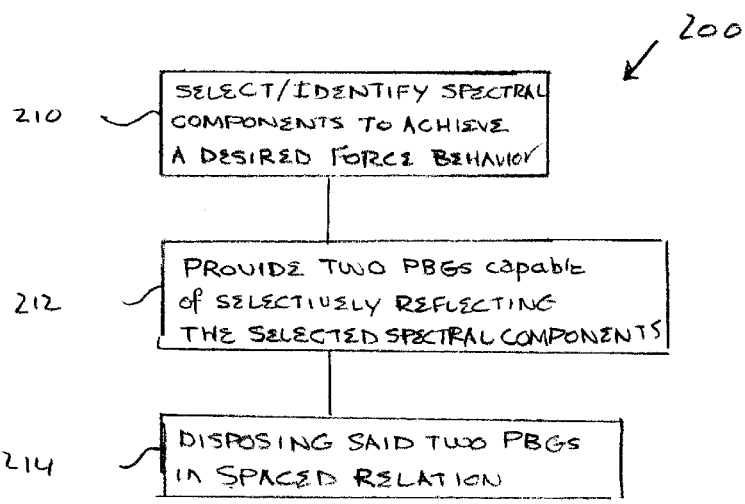
FIG. 2 depicts a flow diagram of a first embodiment of a method for altering dispersion forces in accordance with the present teachings.

FIG. 2 depicts a method 200 in a first embodiment of a method for altering dispersion forces in accordance with the present teachings. As per step 210, spectral components of the dispersion force (e.g., the Casimir force) are selected to achieve a desired force behavior (i.e., repulsive or attractive). In step 212, two PBGs are designed and fabricated to selectively reflect the spectral components selected in step 210 (and to suppress (absorb) other spectral components). Finally, those PBGs are disposed in spaced relation to one another, as indicated in step 214.

Figure 3:
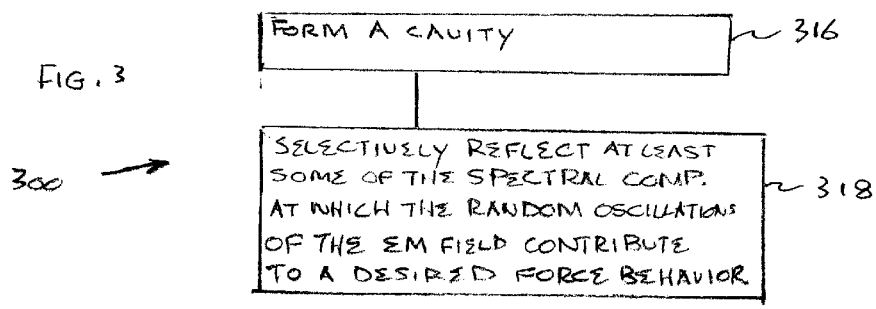
FIG. 3 depicts a flow diagram of a second embodiment of a method for altering dispersion forces in accordance with the present teachings.

FIG. 3 depicts a method 300 in a second embodiment of a method for altering dispersion forces in accordance with the present teachings. As per step 316, a cavity is formed by disposing two materials in opposed relation to each other, wherein at least one of the materials exhibits omni-directional, frequency-selective reflectivity of electromagnetic radiation. And, in step 318, at least some of the spectral components at which the random oscillations of the electromagnetic field contribute to a desired force behavior are selectively reflected, while substantially suppressing all other spectral components.

If, for example, the desired force behavior is repulsive, and if one of the PBGs is restrained and the another is not, the unrestrained PBG will "levitate" or "float" above the other PBG.

I claim:

1. An article for controlling a dispersion force comprising:

a first member comprising a first periodic structure, wherein said first periodic structure is operative to omni-directionally reflect a first group of spectral components of said dispersion force at which random oscillations of an electromagnetic field contribute to a repulsing behavior or an attracting behavior of said dispersion force; and a second member comprising a second periodic structure, wherein said second periodic structure is operative to omni-directionally reflect a second group of spectral components of said dispersion force;

wherein:
   said first member and said second member are disposed in spaced relation to one another;
   at least some of said spectral components from said first group and said second group are the same; and
   said same spectral components contribute to the same selected one of said repulsing behavior or said attracting behavior, as manifested between said first member and said second member.

2. The article of claim 1 wherein said first periodic structure is the same as said second periodic structure.

3. The article of claim 2 wherein said first periodic structure comprises alternating layers of a first material and a second material.

4. The article of claim 1 wherein said first member comprises a third periodic structure operative to reflect a third group of spectral components of said dispersion force at which random oscillations of said electromagnetic field contributes to said selected force behavior.

5. The article of claim 1 wherein said first member comprises a photonic band gap material.

6. A method comprising:

identifying at least one spectral component of a dispersion force at which random oscillations of an electromagnetic field contribute to a selected behavior of said dispersion force, said behavior selected from the group consisting of repulsing and attracting;

providing a first member and a second member that are operative to omni-directionally reflect said one spectral component; and disposing said first member and said second member in spaced relation to one another such that said dispersion force is manifested between said first and second member over a spectrum that includes said first spectral component, thereby enhancing said selected behavior relative to the non-selected behavior.

7. The method of claim 6 wherein said selected behavior is repulsing.

8. The method of claim 7 wherein said first member comprises a first periodic structure.

9. The method of claim 8 wherein said first member comprises a second periodic structure that is operative to omni-directionally reflect a second spectral component of said dispersion force at which random oscillations of said electromagnetic field contribute to said selected behavior of said dispersion force.

10. The method of claim 7 wherein said first member and said second member comprise photonic band gap materials.

11. A method comprising:
    forming a cavity between two flat planar members, each of which members is operative to omni-directionally reflect at least some of the same spectral components of a dispersion force at which random oscillations of an electromagnetic field contribute to a desired behavior of said dispersion force, said desired behavior being selected from the group consisting of repulsing and attracting; and
    selectively reflecting at least paid same spectral components to cause said desired behavior.

12. The method of claim 11 wherein said desired behavior is repulsing.

13. The method of claim 11 wherein at least one of said flat planar members comprises a first periodic structure.

14. The method of claim 13 wherein said one flat planar member comprises a second periodic structure that is operative to omni-directionally reflect different spectral components of said dispersion force than said same spectral components, wherein said different spectral components contribute to said desired behavior of said dispersion force.

15. The method of claim 11 wherein said two flat planar members comprise photonic band gap materials.

16. An article comprising:
    a first member, wherein said first member exhibits omni-directional, frequency-selective reflectivity of electromagnetic radiation; and
    a second member, wherein said second member is disposed in spaced relation to said first member,
    wherein, a dispersion force is manifested between said first member and second member, and said first member is selected to exhibit one desired behavior that is selected from the group consisting of repulsing behavior and attracting behavior, and wherein said selected behavior is manifested between said first member and said second member.

17. The article of claim 16 wherein said first member comprises a photonic band gap material.

18. The article of claim 16 wherein said behavior is repulsing behavior.

19. A method, wherein said method enhances one behavior selected from the group consisting of repulsing behavior and attracting behavior, the method comprising:
    selecting two members, wherein at least one of said members exhibits omni-directional, frequency-selective reflectivity of at least some spectral components of a dispersion force manifested between said two members; and
    forming a cavity by disposing said two members in spaced relation to one another, wherein said omni-directionally-reflected spectral components contribute more to said selected behavior than to the non-selected behavior, and wherein said selected behavior manifests itself between said two members.

20. The method of claim 19 wherein said at least one member comprises a photonic band gap material.

21. The method of claim 19 wherein said selected behavior is repulsing behavior.

* * * * *